United States Patent
Li

(10) Patent No.: US 8,325,646 B2
(45) Date of Patent: Dec. 4, 2012

(54) METHOD AND SYSTEM FOR RESOURCE SCHEDULING IN WIRELESS SYSTEM

(75) Inventor: Ting Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 834 days.

(21) Appl. No.: 12/478,495

(22) Filed: Jun. 4, 2009

(65) Prior Publication Data

US 2009/0245165 A1 Oct. 1, 2009

Related U.S. Application Data

(63) Continuation of application No. PCT/CN2007/071093, filed on Nov. 19, 2007.

(30) Foreign Application Priority Data

Dec. 15, 2006 (CN) .......................... 2006 1 0167170

(51) Int. Cl.
*H04W 72/04* (2009.01)
*H04B 7/14* (2006.01)

(52) U.S. Cl. ........................................ 370/315; 370/329

(58) Field of Classification Search ........................ None
See application file for complete search history.

(56) References Cited

U.S. PATENT DOCUMENTS

| | | | |
|---|---|---|---|
| 2003/0007453 A1 | 1/2003 | Ogier et al. | |
| 2006/0002341 A1 | 1/2006 | Bejerano et al. | |
| 2008/0043747 A1* | 2/2008 | Zheng | 370/395.41 |
| 2009/0201874 A1* | 8/2009 | Okuda | 370/329 |
| 2009/0245165 A1 | 10/2009 | Li | |
| 2011/0182231 A1* | 7/2011 | Wang et al. | 370/315 |
| 2011/0243061 A1* | 10/2011 | Wang et al. | 370/315 |
| 2011/0243062 A1* | 10/2011 | Wang et al. | 370/315 |

FOREIGN PATENT DOCUMENTS

| | | |
|---|---|---|
| CN | 1595892 A | 3/2005 |
| CN | 1633081 A | 6/2005 |
| CN | 1691535 A | 11/2005 |
| CN | 101203037 A | 6/2008 |
| CN | 100596235 C | 3/2010 |
| CN | 101517969 B | 2/2012 |
| WO | 2005/060170 A1 | 6/2005 |
| WO | 2007/096762 A2 | 8/2007 |

OTHER PUBLICATIONS

Written Opinion of the International Searching Authority issued in corresponding PCT Application No. PCT/CN2007/071093; mailed Feb. 14, 2008.

Search Report issued in corresponding PCT Application No. PCT/CN2007/071093; mailed Feb. 14, 2008.

* cited by examiner

Primary Examiner — Min Jung

(74) Attorney, Agent, or Firm — Brinks Hofer Gilson & Lione

(57) ABSTRACT

A method for resource scheduling in a wireless system, applicable to a multi-hop network, includes a MS acquiring bandwidth granted by an MS synchronous station, and transmitting data to the MS synchronous station with the bandwidth. Each node between the MS and an MMR-BS acquires bandwidth granted by the superordinate node of the node between granting the bandwidth to the subordinate node of the node and receiving the data from the subordinate node, and transmits the data to the superordinate node of the node with the bandwidth granted by the superordinate node of the node after receiving the data from the subordinate node.

13 Claims, 10 Drawing Sheets

METHOD AND SYSTEM FOR RESOURCE SCHEDULING IN WIRELESS SYSTEM

CROSS REFERENCE TO RELATED APPLICATIONS

This application claims priority to Chinese patent application No. 200610167170.4 filed Dec. 15, 2006, which is incorporated herein in its entirety by reference.

FIELD OF THE DISCLOSURE

The present disclosure relates to wireless communication technologies, and more particularly, to a method and system for resource scheduling in a wireless system.

BACKGROUND

A wireless communication system, according to the path for communication between a source and a sink, may include a network for directly communicating between the source and the sink, e.g. a cellular network, or a network for communication between the source and the sink via a relay node, e.g. a relay network and a mesh network.

Because the source can directly communicate with the sink, the cellular network may be referred to as a single-hop network, and the network with the relay node is referred to as a multi-hop network.

The single-hop network only includes a Base Station (BS) and a Mobile Station (MS). When uplink bandwidth is allocated, it is necessary only to allocate the bandwidth between the BS and the MS, thus the allocation method is simple. However, the multi-hop network not only includes a Mobile Multi-hop Relay BS (MMR-BS) and an MS, but also includes a Relay Station (RS). The RS has resource scheduling capability, and may acquire node topology information within its own administration range, send a resource scheduling broadcast message, and serve as a synchronous station of other nodes.

FIG. 1 is a schematic diagram illustrating the structure of a typical multi-hop network. As shown in FIG. 1, the multi-hop network includes one MMR-BS, six RSs and four MSs. By taking the leftmost branch as an example, the access station of MS1 and MS2 is RS2; the synchronous station of RS1 is RS3; the synchronous station of RS3 is an MMR-BS; the link between MS1 and RS2 is an access link; the links between RS2 and RS1, between RS1 and RS3, and between RS3 and the MMR-BS are relay links; the link between the MMR-BS and MS1 is a multi-hop link.

In the multi-hop network, there are two resource scheduling methods; one is a centralized resource scheduling method, and the other is a distributed resource scheduling method.

The centralized resource scheduling method includes: the MMR-BS is responsible for centralized allocation of the relay link bandwidth and the access link bandwidth, and the RS has no right of bandwidth allocation. Because the MMR-BS needs to allocate bandwidth for all links, the processing of the MMR-BS is very complex and the RS needs to report detecting results of the links in real time. If the number of link hops is large, the time interval from allocating bandwidth for a link to transmitting data by using the link is large, and the link condition may change during the time interval; in this way, the allocated bandwidth is inapplicable to the changed link condition, which will impact the data transmission.

The distributed resource scheduling method includes: the MMR-BS is responsible for the bandwidth allocation for the link between the MMR-BS and its own next hop node, and the RS is responsible for the bandwidth allocation for the link between the RS and its own next hop node. The disadvantage of the centralized resource scheduling method that the processing of the MMR-BS is very complex may be reduced in the distributed resource scheduling method. However, even if the resource scheduling function of the MMR-BS is independent of that of the RS, the delay of data transmission is still big. As shown in FIG. 2, the MMR-BS, RS1 and RS2 all can independently allocate bandwidth for their respective subordinate nodes; after acquiring the bandwidth, the subordinate nodes transmit data to their respective superordinate nodes. For example, RS2 first allocates bandwidth to an MS, the MS transmits data to RS2 using the allocated bandwidth; RS2 acquires bandwidth from RS1 after a long time, and transmits data to RS1; RS1 acquires bandwidth from the MMR-BS after a long time, and transmits data to the MMR-BS. Therefore, if the resource scheduling function of MMR-BS is independent of that of the RS, the delay of data transmission will be big. The MMR-BS and the RS allocate bandwidth for their respective subordinate nodes by a bandwidth grant method.

A distributed scheduling method based on a whole link mechanism is proposed at present in order to overcome the problem of data transmission delay in the distributed resource scheduling method, and includes: the MMR-BS and each RS allocate bandwidth for their respective subordinate nodes in turn; when an MS transmits data, the MS and each RS have acquired the bandwidth, thus the MS can rapidly transmit the data in the uplink until the data arrives at the MMR-BS.

The distributed resource scheduling method based on a whole-link mechanism can overcome the delay of data transmission. However, because bandwidth of all links is allocated before the MS transmits data, the time interval from allocating bandwidth for a link to transmitting data by using the link is large if the number of link hops is large. For example, a link includes the MMR-BS, RS2, RS1 and the MS; the MMR-BS first allocates bandwidth for RS2; RS2 allocates bandwidth for RS1; RS1 allocates bandwidth for the MS; the MMR-BS, RS2 and RS1 wait for the data transmitted by their respective subordinate nodes after allocating the bandwidth for their respective subordinate nodes; the MS directly transmits data to the MMR-BS via RS1 and RS2 using the allocated bandwidth. That is to say, after the bandwidth is allocated for each node, the time for transmitting data from the MS to the MMR-BS is reduced, but at the cost of the long waiting time of the MMR-BS and each RS. Therefore, the time from allocating bandwidth to transmitting the data completely is still long. However, because the MMR-BS and each RS allocate bandwidth for their respective subordinate nodes in advance, the link condition may also change during the waiting time for the data transmission; in this way, the allocated bandwidth may be inapplicable to the changed link condition, which will impact the data transmission.

SUMMARY

Embodiments of the present disclosure provide a method and system for resource scheduling in a wireless system, which may effectively reduce the data transmission time and enable the allocated bandwidth to be applicable to the real-time link condition so as to effectively avoid the problem of invalidation of the allocated bandwidth.

A method for resource scheduling in a wireless system, applicable to a multi-hop network, includes acquiring, by a Mobile Station (MS), bandwidth from an MS synchronous station, and transmitting data to the MS synchronous station with the bandwidth acquired from the MS synchronous station. The method further includes acquiring, by each node between the MS and a Mobile Multi-hop Relay Base Station (MMR-BS), bandwidth granted by the superordinate node of the node between granting bandwidth to the subordinate node of the node and receiving the data from the subordinate node, and transmitting the data to the superordinate node of the node with the bandwidth granted by the superordinate node after receiving the data from the subordinate node.

A system for resource scheduling in a wireless system, applicable to a multi-hop network, includes a Mobile Multi-hop Relay Base Station (MMR-BS), one or more than one Mobile Station (MS), one or more than one Relay Station (RS) between the MMR-BS and wherein a superordinate node of the MS is an MS synchronous station. The MS is capable of acquiring bandwidth from the MS synchronous station and transmitting data to the MS synchronous station with the bandwidth acquired from the MS synchronous station. Each RS between the MS and the MMR-BS is capable of acquiring bandwidth granted by the superordinate node of the RS between granting bandwidth to the subordinate node of the RS and receiving data from the subordinate node, and transmitting the data to the superordinate node with the bandwidth granted by the superordinate node after receiving the data from the subordinate node.

To sum up, embodiments of the present disclosure provide a method for resource scheduling in a wireless system. Because each node may acquire bandwidth before receiving data transmitted by its subordinate node, the time interval between acquiring the bandwidth and receiving the data is short, which not only effectively reduces the data transmission time, but also enables the allocated bandwidth to be applicable to the real-time link condition so as to effectively avoid the invalidation of the allocated bandwidth.

DETAILED DESCRIPTION OF THE DISCLOSURE

A further detailed description of the present disclosure is hereinafter given with reference to embodiments and accompanying drawings.

The present disclosure includes: a Mobile Station (MS) acquiring bandwidth from an MS synchronous station, and transmitting data to the MS synchronous station with the acquired bandwidth; each node between the MS and an MMR-BS acquiring bandwidth granted by the superordinate node of the node during the time interval between granting the bandwidth to the subordinate node of the node and receiving data from the subordinate node, and transmitting data to the superordinate node with the bandwidth granted by the superordinate node after receiving the data from the subordinate node.

The method may be applicable to a multi-hop network including an MMR-BS, an MS and one or more than one RSs. The MMR-BS is the most superordinate node in an uplink and the MS is the most subordinate node in the uplink.

Figure 1:
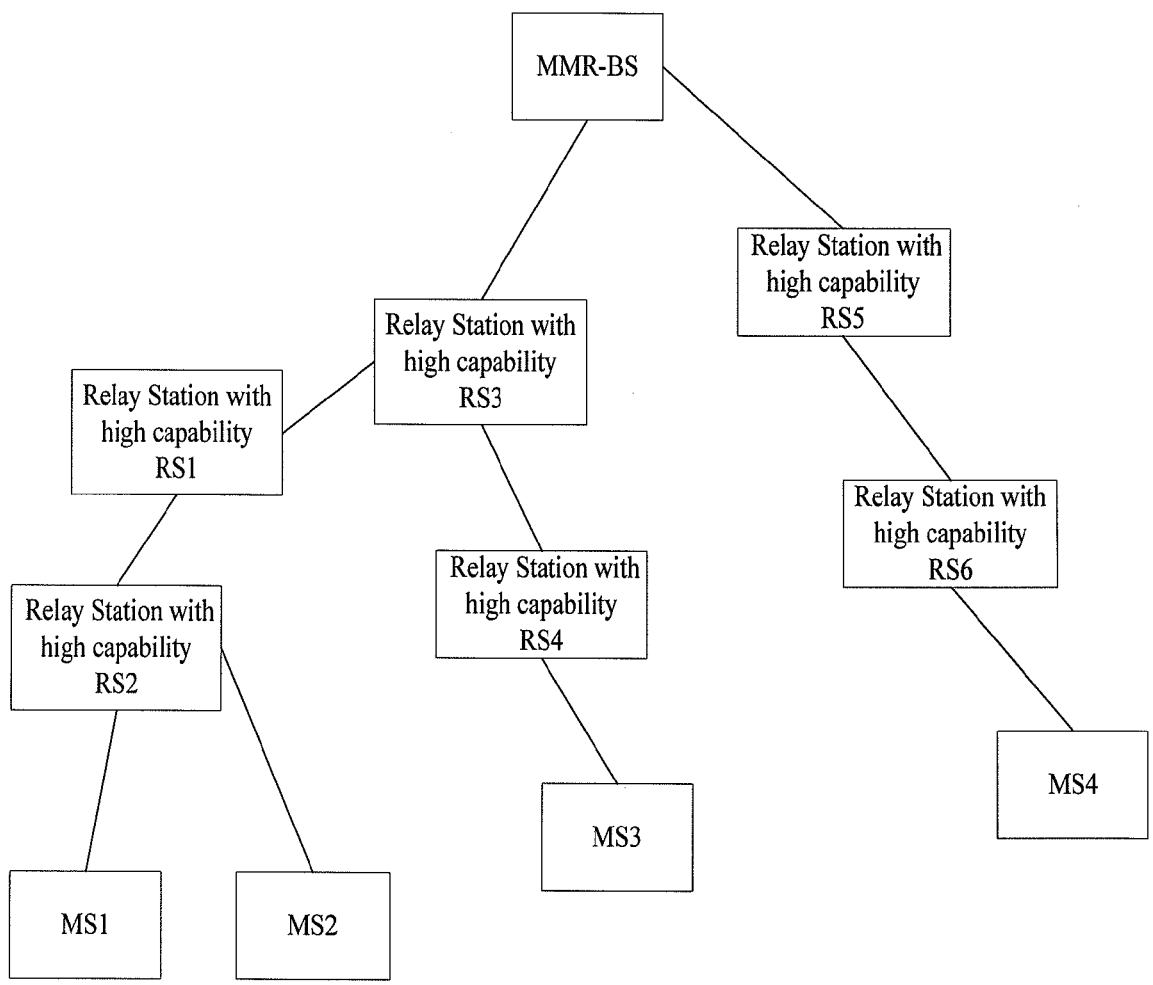
FIG. 1 is a schematic diagram illustrating the structure of a typical multi-hop network in the prior art.
Figure 2:
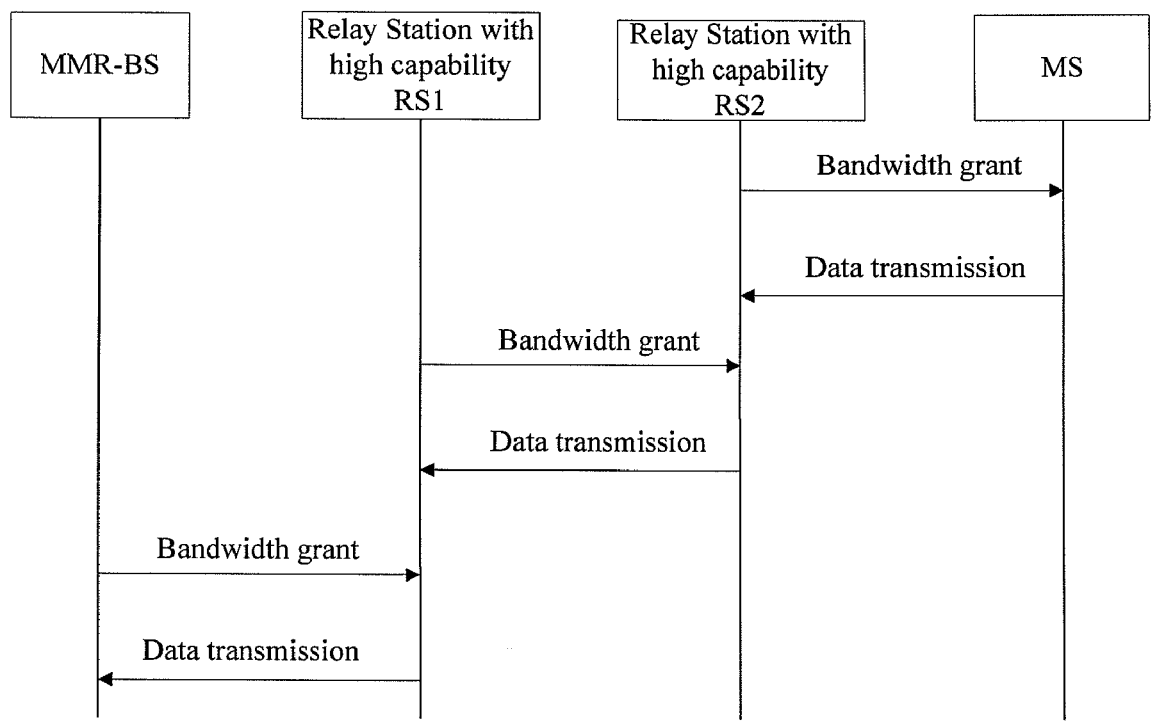
FIG. 2 is a schematic diagram illustrating the message flow of a distributed resource scheduling method in the prior art.
Figure 3:
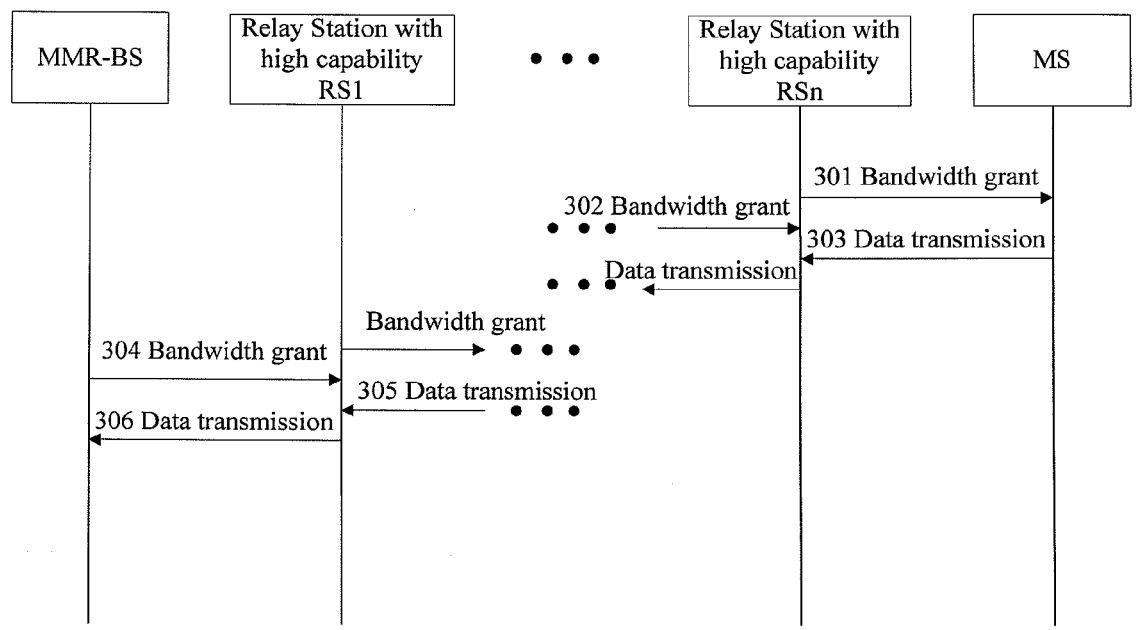
FIG. 3 is a schematic diagram illustrating the message flow of implementing resource scheduling in accordance with an embodiment of the present disclosure.

FIG. 3 is a schematic diagram illustrating the message flow of implementing resource scheduling in accordance with the present disclosure. As shown in FIG. 3, the method includes the following.

301: An MS synchronous station grants bandwidth to an MS.

302: A superordinate node of the MS synchronous station grants bandwidth to the MS synchronous station.

303: The MS transmits data to the MS synchronous station with the bandwidth granted by the MS synchronous station.

After receiving the data transmitted by the MS, the MS synchronous station sends the data to the superordinate node of the MS synchronous with the bandwidth acquired in 302.

There are one or more RS between the MS and the MMR-BS in a multi-hop network, but the embodiments of the present disclosure only take one RS as an example for convenience. If there are more than one RS between the MS and the MMR-BS, the implementation of the RSs between the MS synchronous station and the MMR-BS is similar to the implementation of the MS synchronous station described herein. That is to say, the process similar to 301 to 303 is performed before 304, and then the data is transmitted to the subordinate node of the MMR-BS, i.e. the following 305; before the MMR-BS receives the data transmitted by the subordinate node of the MMR-BS, and 304 is performed.

304: The MMR-BS grants bandwidth to the subordinate node of the MMR-BS.

305: The subordinate node of the MMR-BS receives the data transmitted by its own subordinate node.

306: The subordinate node of the MMR-BS transmits the data to the MMR-BS with the bandwidth granted by the MMR-BS.

As can be seen from FIG. 3, the distributed resource scheduling mode is still used in the present disclosure, i.e. the MMR-BS and the RS allocate bandwidth for their respective subordinate nodes. It should be noted that, the bandwidth is not allocated for each link before the MS transmits data in the uplink in the present disclosure; each node acquires the allocated bandwidth from its own superordinate node before receiving the data from its own subordinate node. For example, each node acquires the bandwidth allocated by its superordinate node at the previous frame before the data from its subordinate node arrives at it. In this way, upon the receipt of the data transmitted by the subordinate node, the node may transmit the data to its superordinate node immediately.

Because the time interval between acquiring the bandwidth by each node and transmitting the data using the bandwidth is only one frame, it is possible to greatly reduce the whole data transmission time.

In the present disclosure, there are five types of resource scheduling methods. In the first type the system grants bandwidth for a service directly; in the second type the system requests bandwidth before granting the bandwidth; in the third type the system first performs polling, requests bandwidth, and then grants the bandwidth; in the fourth type the system first initiates a polling request, performs the polling according to the polling request, requests bandwidth, and then grants the bandwidth; in the fifth type the system initiates a bandwidth request using a CDMA code, and then grants the bandwidth.

The implementation of the first type is based on the disclosure shown in FIG. 3, and further includes: before 301, the MMR-BS generating an scheduling management message according to system resource and service requirements, and sending the scheduling management message to the subordinate node of the MMR-BS; each node between the MMR-BS and the MS synchronous station determining appropriate bandwidth allocation for the uplink controlled by the node in turn according to the received scheduling management message, the system resource and service requirements, and sending a scheduling management message of the node to the subordinate node of the node to notify the subordinate node of the determined bandwidth allocation, wherein the scheduling management message is an uplink scheduling message sent to the subordinate node for indicating the time for granting the subordinate node a given uplink bandwidth allocation and the allocated bandwidth. Because the MMR-BS and the RS generate their respective scheduling management messages, this method may be referred to as a distributed scheduling management method.

The implementation of the first type is based on the disclosure shown in FIG. 3, and may also further include: before 301, the MMR-BS generating a scheduling management message according to system resource and service requirements, and sending the scheduling management message to each node of a downlink hop by hop until the scheduling management message is sent to the MS synchronous station; wherein the scheduling management message is uplink scheduling information sent to the subordinate node for indicating the time for granting the subordinate node a given uplink bandwidth allocation and the allocated bandwidth.

The RS does not independently generate the scheduling management message, and only forwards the scheduling management message after reading the scheduling management message or forwards the scheduling management message after deleting and modifying contents related to the RS in the received scheduling management message. Because the scheduling management message is generated by the MMR-BS uniformly, the method may be referred to as a centralized scheduling management method. It should be noted that, the "centralized" is directed to the scheduling management message; for the whole bandwidth allocation, the method is still a distributed method.

The implementation of the second type is based on the disclosure shown in FIG. 3, and further includes: each node between the MS and the MMR-BS sending a bandwidth request to the superordinate node of the node before acquiring bandwidth granted by the superordinate node.

For the control of the polling time and the control of the Bandwidth Grant time, the third type includes two modes.

The mode for the control of the polling time is based on the second type, and includes: before each node sends a bandwidth request to the superordinate node of the node, the MMR-BS generating a scheduling management message according to system resource and service requirements, and sending the scheduling management message to the subordinate node of the MMR-BS; each node from the MMR-BS to the MS synchronous station generating the scheduling management message of the node in turn according to the received scheduling management message, the system resource and service requirements, and sending the scheduling management message to the subordinate node of node, wherein the scheduling management message includes the polling time and the allocated bandwidth size during the polling; the polling time being the time for the node sending the scheduling management message initiating the polling to the subordinate node or the time for the subordinate node initiating the polling to its own subordinate node; each node from the MS synchronous station to the MMR-BS sending the polling to the subordinate node of the node in turn. Because the MMR-BS and the RS generate their respective scheduling management messages, the method may be referred to as a distributed scheduling management method.

The mode for the control of the polling time is based on the second type, and further includes: before each node sends a bandwidth request to its superordinate node, the MMR-BS generating a scheduling management message according to system resource and service requirements, and sending the scheduling management message to each node of a downlink hop by hop until the scheduling management message is sent to the MS synchronous station, wherein the scheduling management message includes the polling time and the allocated bandwidth size during the polling; the polling time being the time for all nodes sending the scheduling management message initiating the polling to their respective subordinate nodes or the time for all subordinate nodes initiating the polling to their respective subordinate nodes; each node from the MS synchronous station to the MMR-BS sending the polling to the subordinate node of the node in turn. Because the RS does not independently generate the scheduling management message and the scheduling management message is generated by the MMR-BS uniformly, the method may be referred to as a centralized scheduling management method. It should be noted that, the "centralized" is directed to the scheduling management message; for the whole bandwidth allocation, the method is still a distributed method.

The mode for the control of the Bandwidth Grant time is based on the first type, and further includes: before generating its own scheduling management message, each node from the MMR-BS to the MS synchronous station initiating the polling to its subordinate node in turn, and receiving the bandwidth request which is returned by its subordinate node with the bandwidth acquired from the polling.

The implementation of the fourth type is based on the second type, and further includes: before sending a bandwidth request to its superordinate node, each node from the MS to the MMR-BS sending a polling request to its superordinate node in turn; each node from the MS synchronous station to the MMR-BS initiating the polling to its subordinate node.

The implementation of the fifth type is based on the second type, and further includes: before sending a bandwidth request to its superordinate node, each node from the MS to the MMR-BS sending a Code Division Multiple Access (CDMA) request code to its superordinate node; each node receiving the CDMA request code returning a CDMA_Allocation_IE to its subordinate node.

In practical applications, based on the third type, if the system determines that the polling may be performed for a service, each node from the MS synchronous station to the MMR-BS may also initiate the polling to its subordinate node in turn before Bandwidth Grant; the subordinate node sends a bandwidth request to its superordinate node with the bandwidth acquired from the polling.

The present disclosure is hereinafter described in detail with respect to embodiments, so as to make the present disclosure apparent.

A First Embodiment:

The multi-hop network in this embodiment includes an MMR-B S and RS1 to RSn; RSn is an MS synchronous station. The first type resource scheduling method is used in this embodiment, and the scheduling management message is a distributed scheduling management message.

Figure 4:
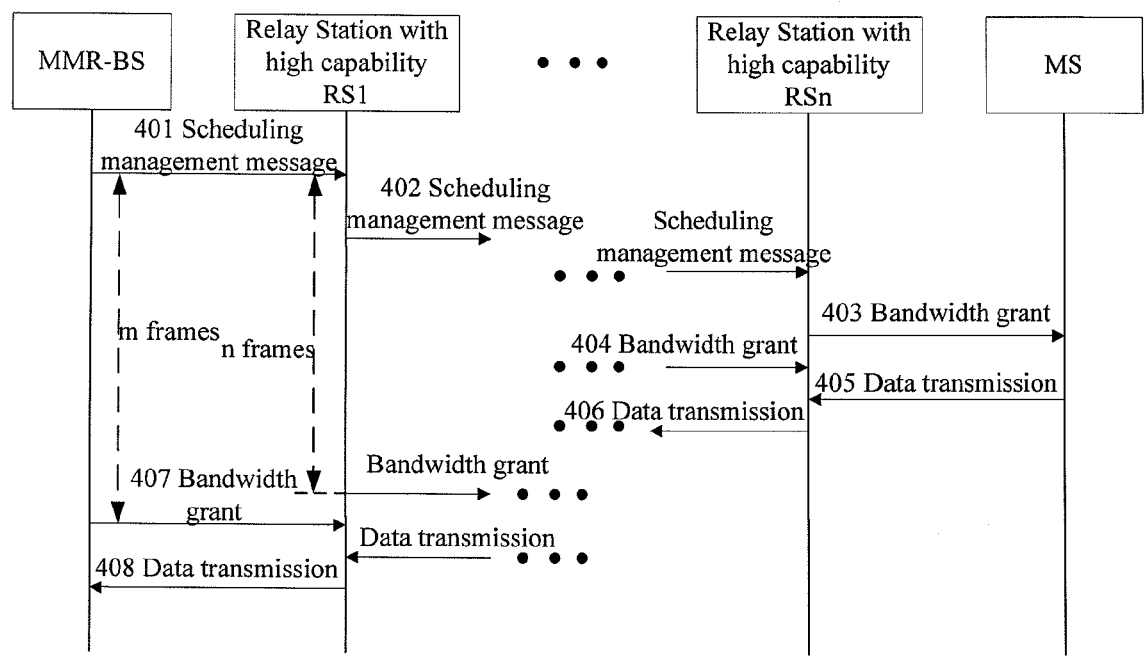
FIG. 4 is a schematic diagram illustrating the message flow in accordance with a first embodiment of the present disclosure.

FIG. 4 is a schematic diagram illustrating the message flow in accordance with this embodiment. As shown in FIG. 4, the method of this embodiment includes the following.

401: The MMR-BS generates a scheduling management message according to system resource and service requirements, and sends the scheduling management message to RS1. The scheduling management message is uplink scheduling information sent by the MMR-BS or the RS to its subordinate RS for indicating the time (i.e. in which frame) for granting a given uplink bandwidth allocation and the allocated bandwidth to its subordinate RS. The practical Bandwidth Grant to the subordinate RS is performed according to a Bandwidth Grant information element carried in subsequent downlink allocation broadcast messages.

The system resource and service requirements may be system resource conditions, path information, the delay of each link and Quality of Service (QoS) information.

In practical applications, the time interval between sending the scheduling management message and granting bandwidth to the subordinate node should be noticed. If the time interval is too long, the transmission delay is long, and thus it is impossible to reduce the delay; if the time interval is too short, the situation that no data may be transmitted after the bandwidth is allocated to the subordinate node will occur.

In practical applications, the time for granting bandwidth may be measured by the number of data frames. For example, the Bandwidth Grant time in the scheduling management message sent by the MMR-BS to RS1 is m frames; the m represents that the MMR-BS grants bandwidth to RS1 at the mth frame, and RS1 may determine the time for sending the scheduling management message to its subordinate node and the Bandwidth Grant time according to the Bandwidth Grant time, system resource conditions and path information in the scheduling management message sent by the MMR-BS, and the rest may be deduced by analogy, so as to guarantee that RS1 may transmit data to the MMR-BS at the next frame after its subordinate node transmit data to it.

The above scheduling management message is a distributed scheduling management message. If the scheduling management message is a centralized scheduling management message, the MMR-BS needs to determine the time for each RS receiving the Bandwidth Grant from the superordinate node of the RS in the scheduling management message generated by the MMR-BS. In addition, it is needless for each node to generate its own scheduling management message after receiving a scheduling management message from the superordinate node, but only needed to send the scheduling management message to its subordinate node after deleting information related to the node from the scheduling management message, or to send the scheduling management message to the subordinate node directly without deleting any information.

402: After receiving the scheduling management message from its superordinate node, RS1 determines appropriate bandwidth allocation for the uplink controlled by the RS1 according to the received scheduling management message, the system resource and service requirements, and sends its own scheduling management message to its subordinate node to notify the subordinate node of the bandwidth allocation made by RS1; the situation with the rest nodes may be deduced by analogy until the MS synchronous station, i.e. RSn, receives the scheduling management message.

403: RSn grants bandwidth to the MS according to the scheduling management message, i.e. allocates the bandwidth for the MS, and sends the allocated bandwidth to the MS.

404: RSn acquires the allocated bandwidth from the Bandwidth Grant made by its superordinate node.

405: The MS transmits data to RSn with the bandwidth granted by RSn.

406: RSn transmits the data to its superordinate node with bandwidth granted by its superordinate node.

Afterwards, RSn transmits the data in the uplink continuously, and the processing of RSn is the same as the processing of RS1 and will not be further described herein.

407: The MMR-BS grants bandwidth to RS1 according to the scheduling management message.

408: RS1 receives the data from its subordinate node, and transmits the data to the MMR-BS with the bandwidth granted by the MMR-BS.

In practical applications, this embodiment may be used for a Unsolicited Grant Service (UGS), a Real-time Polling Service (rtPS), an extended rtPS, a Non-real-time Polling Service (nrtPS) and a Best Effort (BE) service. When this embodiment is used for the UGS service, the MMR-BS may send a scheduling management message to its subordinate RS in advance for indicating the time for allocating bandwidth for this service and the allocated bandwidth size; when this embodiment is used for the Extended rtPS service, the MMR-BS may send a scheduling management message to its subordinate RS in advance for indicating the time for allocating bandwidth for this service and the allocated bandwidth size.

If the UGS needs to readjust bandwidth or establish a new traffic flow during operating the UGS using the first type resource scheduling method, the method further includes the following.

The MS sends a polling request to the MS synchronous station with the acquired bandwidth; the MS synchronous station sends a polling request to its superordinate node after receiving the polling request from the MS, and initiates polling to the MS; the MS sends a new bandwidth request to the MS synchronous station with the bandwidth acquired from the polling; the MS synchronous station sends a new bandwidth request to its superordinate node with the bandwidth acquired from the polling of its superordinate node and grants bandwidth to the MS; the MS sends UGS service data or new service data to the MS synchronous station with the bandwidth acquired from the Bandwidth Grant; the MS synchronous station sends the UGS service data or the new service data to its superordinate node with the new bandwidth acquired from the Bandwidth Grant of its superordinate node; the rest may be deduced by analogy until the UGS service data or the new service data is sent to the MMR-BS. This process is the same as a fourth embodiment shown in FIG. 8.

If the rtPS service needs to readjust bandwidth during operating the extended rtPS service using the first type resource scheduling method, the method further includes the following.

The MS sends a new bandwidth request to the MS synchronous station; the MS synchronous station sends a new bandwidth request to its superordinate node and grants bandwidth to the MS; the MS transmits extended rtPS service data to the MS synchronous station with the bandwidth acquired from the Bandwidth Grant of the MS synchronous station; the MS synchronous station transmits the extended rtPS service data to its superordinate node with the bandwidth acquired from the Bandwidth Grant of the superordinate node; the situation with the rest nodes may be deduced by analogy until the extended rtPS service data is transmitted to the MMR-BS. The new bandwidth request may be carried in the allocated bandwidth in a bandwidth stealing manner or carried in Channel Quality Information Channel (CQICH).

When the bandwidth that a node grants to its subordinate node is used up, if the MS requests bandwidth again, the second type of the present disclosure may be used; wherein the bandwidth request may be carried in a CQICH channel; alternatively, the third type of the present disclosure may be used for the bandwidth request, wherein the bandwidth request may be carried in the bandwidth acquired from the unicast, multicast or broadcast polling of the superordinate node.

A Second Embodiment:

The same as the first embodiment, the multi-hop network of this embodiment may also include an MMR-BS and RS1~RSn, wherein RSn is the MS synchronous station. The second type of resource scheduling method is used in this embodiment.

Figure 5:
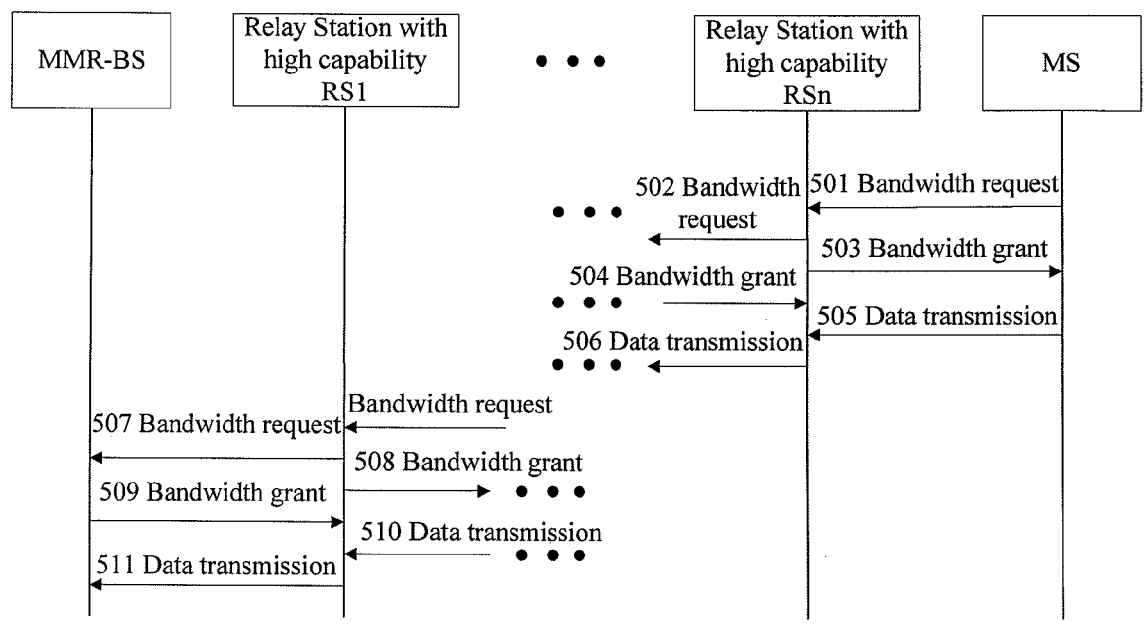
FIG. 5 is a schematic diagram illustrating the message flow in accordance with a second embodiment of the present disclosure.

FIG. 5 is a schematic diagram illustrating the message flow in accordance with this embodiment. As shown in FIG. 5, the method of this embodiment includes the following.

501: An MS sends a bandwidth request to RSn.

502: After receiving the bandwidth request sent by the MS, RSn sends a bandwidth request to its superordinate node without waiting for the arrival of data sent by the MS, i.e. RSn may send the bandwidth request to its superordinate node after receiving the bandwidth request of the MS and before the arrival of data sent by the MS, or send the bandwidth when the data sent by the MS arrives at RSn.

503: RSn grants bandwidth to the MS.

504: RSn acquires bandwidth from its superordinate node.

505: The MS transmits the data to RSn with the bandwidth acquired from the Bandwidth Grant of RSn.

506: RSn transmits the data to its superordinate node with the bandwidth acquired from the Bandwidth Grant of its superordinate node.

Because there are multiple RSs between the MMR-BS and the MS, other RSs perform the processes of bandwidth request, Bandwidth Grant and data transmission continuously; after receiving the bandwidth request sent by its subordinate node, a node may send a bandwidth request to its superordinate node directly without waiting for the arrival of data sent by its subordinate node, which is the same as RSn, until RS1 receives the bandwidth request. By this method, it is possible to reduce the data transmission delay.

507: RS1 sends a bandwidth request to the MMR-BS.

508: RS1 grants bandwidth to its subordinate node.

509: The MMR-BS grants bandwidth to RS1.

510: RS1 receives the data transmitted by its subordinate node.

511: RS1 transmits the received data to the MMR-BS with the bandwidth acquired from the Bandwidth Grant of MMR-BS.

In this embodiment, when requesting the bandwidth from its superordinate node, each node may send the bandwidth request in a bandwidth stealing manner, or send an individual bandwidth request.

In this embodiment, in order to reduce the delay as much as possible, each node may send a bandwidth request to its superordinate node at the next frame after receiving the bandwidth request from its subordinate node; in this way, the node may receive bandwidth returned by its superordinate node as soon as possible. For example, the node may acquire the bandwidth at the previous frame before receiving the transmission data from its subordinate node, so as to guarantee that the data is transmitted to the superordinate node in time. In practical applications, to avoid the case that the bandwidth is allocated by the superordinate node and no data needs to be transmitted, after receiving the bandwidth request from the subordinate node, this node may send a bandwidth request to the superordinate node after several frames and before the data transmitted by the subordinate node reaches this node. In this case, if the data transmitted by the subordinate node arrives at this node, the data may be temporarily stored in a buffer and be continuously transmitted until the bandwidth granted by the superordinate node is acquired.

In practical applications, this embodiment may be used for a rtPS service, an Extended rtPS service, a nrtPS service and a BE service.

A Third Embodiment:

The same as the first embodiment, the multi-hop network of this embodiment also includes an MMR-BS and RS1~RSn, wherein RSn is an MS synchronous station. The third type of resource scheduling method, i.e the resource scheduling method for the control of the polling time or the control of the Bandwidth Grant time is used in this embodiment; the scheduling management message is a centralized scheduling management message.

Figure 6:
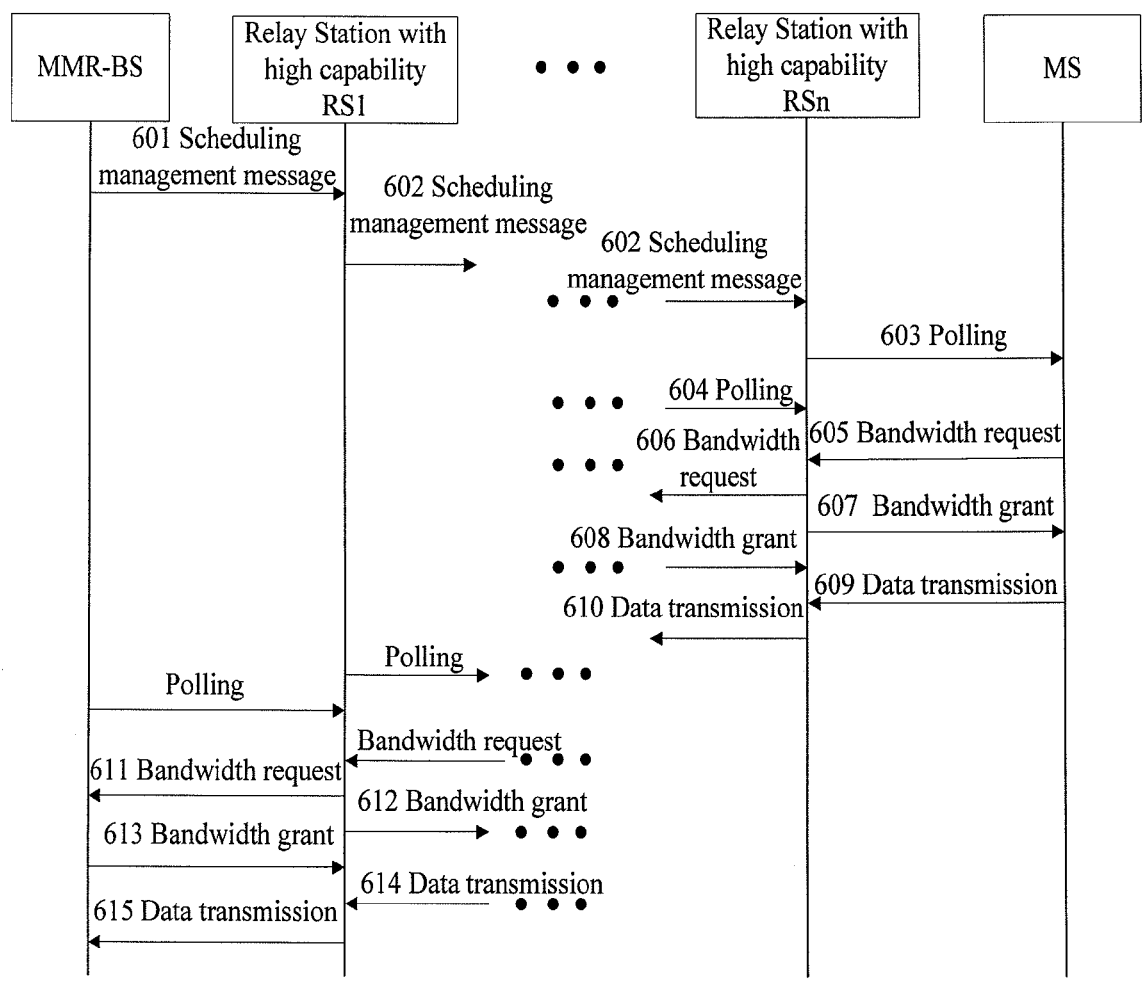
FIG. 6 is a schematic diagram illustrating the message flow of controlling the polling time in accordance with a third embodiment of the present disclosure.

FIG. 6 is a schematic diagram illustrating the message flow of a resource scheduling method for the control of the polling time. As shown in FIG. 6, the resource scheduling method for the control of the polling time includes the following.

601: The MMR-BS generates a scheduling management message according to system resource and service requirements, and sends the scheduling management message to RS1.

The scheduling management message is similar to that in the first embodiment, and the difference is only that, the scheduling management message in this embodiment is used for indicating when to poll the subordinate node and the allocated bandwidth size during the polling. In addition, because the scheduling management message is a centralized scheduling management message, the scheduling management message may be carried in a Media Access Control (MAC) layer management message or a MAP Information Element (MAP_IE).

If it is carried in the MAC layer management message, the format is shown in Table 3.

TABLE 3

| Syntax | Size | Description |
|---|---|---|
| Scheduling management message format ( ) | | |
| Message Type=M | 8 Bytes | M is any number unused in 802.16e |
| Allocated bandwidth | 8 Bytes | MAC layer bandwidth |
| The number of nodes | 4 Bytes | The number of the RSs operating a distributed scheduling algorithm in a multi-hop link |

TABLE 3-continued

| Syntax | Size | Description |
| --- | --- | --- |
| For ( i ;i<=n;i++) {<br>The time for waiting<br>}| 8 Bytes | Unit is frame |
| Time/Length/Value (TLV) coding message | Variable length | Other information based on the TLV number |

If it is carried in the ULMAP IE, the format is shown in Table 4.

TABLE 4

| Syntax | Size | Description |
| --- | --- | --- |
| Scheduling management message format ( ) | | |
| Extended 2 type UIUC=M | 8 Bytes | M is any number unused in 802.16e |
| Length | 8 Bytes | The length of current IE |
| Allocated bandwidth | 8 Bytes | MAC layer bandwidth |
| The number of nodes | 4 Byte | The number of the RSs operating a distributed scheduling algorithm in a multi-hop link |
| For ( i ;i<=n;i++) {<br>The time for waiting<br>} | 8 Bytes | Unit is frame |

Certainly, in practical applications, the scheduling management message may not use the format shown in Tables 3 and 4 as long as the Bandwidth Grant time and the allocated bandwidth size are notified to the subordinate node.

In addition, the same as the first embodiment, it should be noticed in this embodiment the time interval between sending a scheduling management message and polling the subordinate node. If the time interval is too long, the transmission delay is long and it is impossible to reduce the delay; if the time interval is too short, the case that no data needs to be transmitted after the polling for the subordinate node. Likewise, each node should acquire the bandwidth allocated by its superordinate node via the polling at the previous frame before receiving the bandwidth request from its subordinate node, so as to transmit data immediately and reduce the delay and the requirement for the buffer.

602: RS1 sends the received scheduling management message to its subordinate node, and the rest may be deduced by analogy until the MS synchronous station, i.e. RSn, receives the scheduling management message.

603: RS1 initiates the polling to the MS according to the scheduling management message, and sends bandwidth for carrying a bandwidth request to the MS during the polling.

604: RS1 receives the polling of its superordinate node, and acquires the bandwidth for carrying a bandwidth request from the polling.

The implementation of 605 to 615 is similar to that of 501 to 511 in the second embodiment, and the difference is only that, when each node requests bandwidth from its superordinate node, the superordinate node first initiates the polling, and the bandwidth request sent to the superordinate node is carried in the bandwidth acquired from the polling.

For an rtPS service, the MMR-BS may send a scheduling management message to its subordinate RS in advance for indicating the time for polling the subordinate RS. In addition, after receiving the polling, if it is needless to request bandwidth for itself, by using the bandwidth acquired from the polling, the MS and each RS may also transmit data directly or send a bandwidth request with the bandwidth request size set to zero. When the data is transmitted directly, the processes relating to the bandwidth request and Bandwidth Grant in FIG. 6 may be omitted. FIG. 6 shows the case that the subordinate node needs to request the bandwidth after the polling.

Figure 7:
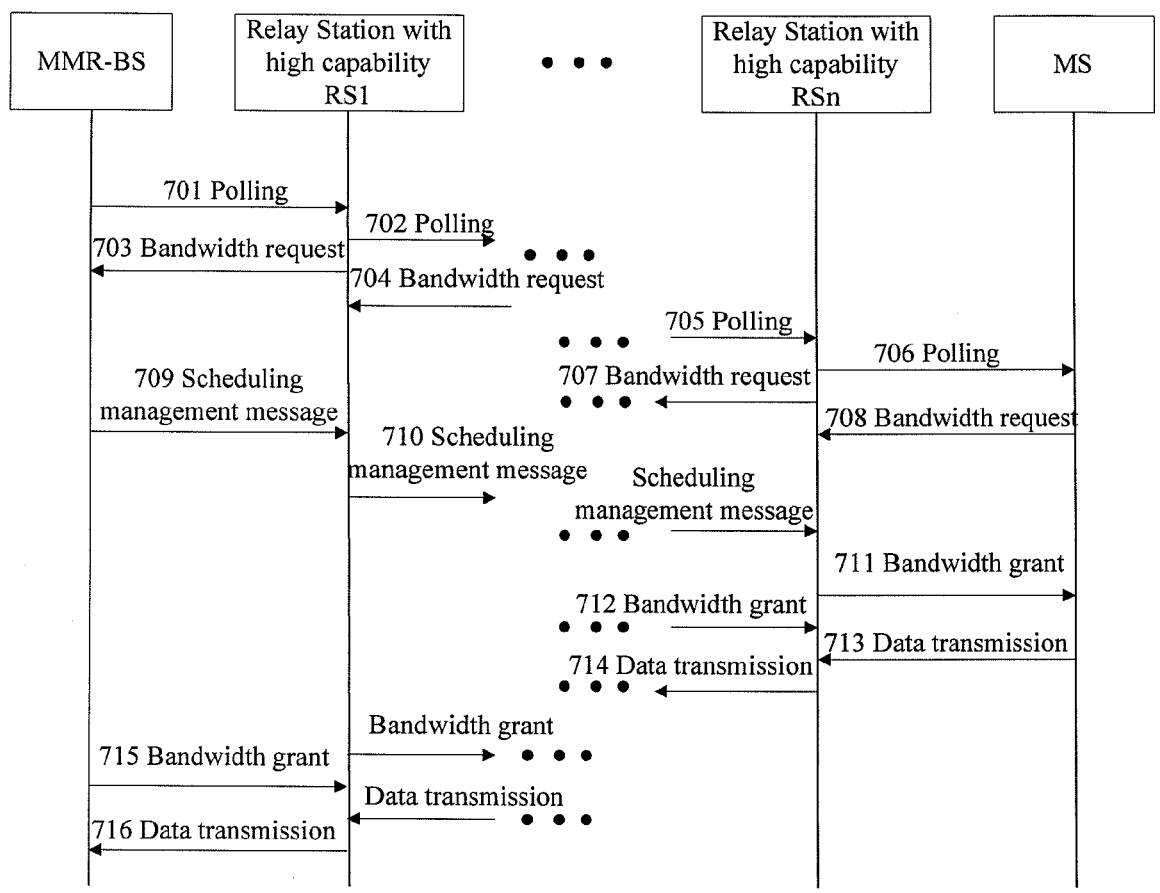
FIG. 7 is a schematic diagram illustrating the message flow of controlling the Bandwidth Grant time in accordance with a third embodiment of the present disclosure.

FIG. 7 is a schematic diagram illustrating the message flow of the resource scheduling method for the control of the Bandwidth Grant time. As shown in FIG. 7, the resource scheduling method for the control of the Bandwidth Grant time includes the following.

701 to 708: Each node from the MMR-BS to RSn polls their respective subordinate nodes in turn, and receives a bandwidth request returned by its subordinate node with the bandwidth acquired from the polling.

709 to 716 are similar to 401 to 408 in the first embodiment, and will not be further described herein.

In practical applications, the resource scheduling methods for the control of the polling time and the control of the Bandwidth Grant time may be applicable to a rtPS service, a nrtPS service and a BE service.

If the rtPS service needs to readjust bandwidth during operating the rtPS service, the method further includes: the MS sending a new bandwidth request to its synchronous station in a bandwidth stealing mode; the MS synchronous station sending a new bandwidth request to its superordinate node and granting bandwidth to the MS; the MS transmitting rtPS service data to the MS synchronous station with the bandwidth acquired from the Bandwidth Grant of the MS synchronous station; the MS synchronous station transmitting the rtPS service data to its superordinate node with the bandwidth acquired from the Bandwidth Grant of its superordinate node. The MS synchronous stations may be deduced by analogy until the rtPS service data is transmitted to the MMR-BS.

Alternatively, if the rtPS service needs to readjust bandwidth during operating the rtPS service, the method further includes: after each node receives rtPS service data transmitted by its subordinate node, the current node receiving the rtPS service data initiating the polling to its subordinate node; the subordinate node sending a new bandwidth request to the current node with the bandwidth acquired from the polling; the current node granting bandwidth to its subordinate node; the subordinate node transmitting the rtPS service data to the current node with the bandwidth acquired from the Bandwidth Grant.

A Fourth Embodiment:

The same as the first embodiment, the multi-hop network in this embodiment may also include an MMR-BS and RS1~RSn, wherein RSn is the MS synchronous station. In addition, the fourth type of resource scheduling method is used in this embodiment.

Figure 8:
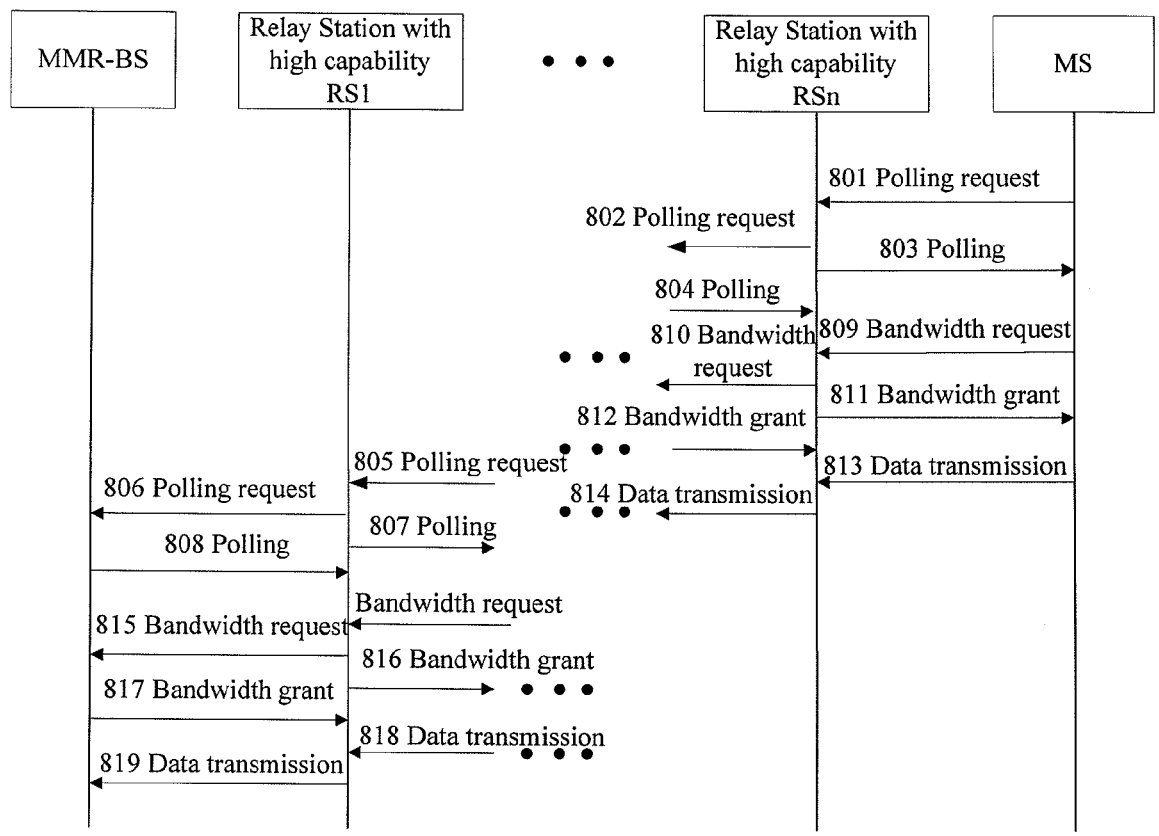
FIG. 8 is a schematic diagram illustrating the message flow in accordance with a fourth embodiment of the present disclosure.

FIG. 8 is a schematic diagram illustrating the message flow in accordance with this embodiment. As shown in FIG. 8, the method of this embodiment includes the following.

801 to 808: Each node from the MS to the MMR-BS sends a polling request to its superordinate node in turn; each node from the MS synchronous station to the MMR-BS initiates the polling to its subordinate node in turn.

Similar to the above embodiments, in this embodiment, in order to reduce the delay, each node sends a polling request to its superordinate node at the next frame after receiving the polling request from its subordinate node, so as to guarantee that this node has acquired the bandwidth from the polling of its superordinate node when the subordinate node sends a bandwidth request, thereby transmitting a bandwidth request to its superordinate node as soon as possible. To avoid the long delay between acquiring the bandwidth and receiving the bandwidth request, after receiving a polling request from the subordinate node, the node may send the polling request to its superordinate node after several frames and before receiving the data sent by the subordinate node. In this way, the bandwidth request may be sent in the bandwidth allocated by the superordinate node after being buffered in this node for a period of time.

809 to 819 are the same as 501 to 511 in the second embodiment, and will not be further described herein.

In practical applications, this embodiment may be applicable to the case that the UGS service needs to readjust bandwidth or establish a new traffic flow during operating.

A Fifth Embodiment:

The same as the first embodiment, the multi-hop network in this embodiment may also include an MMR-BS and RS1~RSn, wherein RSn is the MS synchronous station. In addition, the fifth type of resource scheduling method is used in this embodiment.

Figure 9:
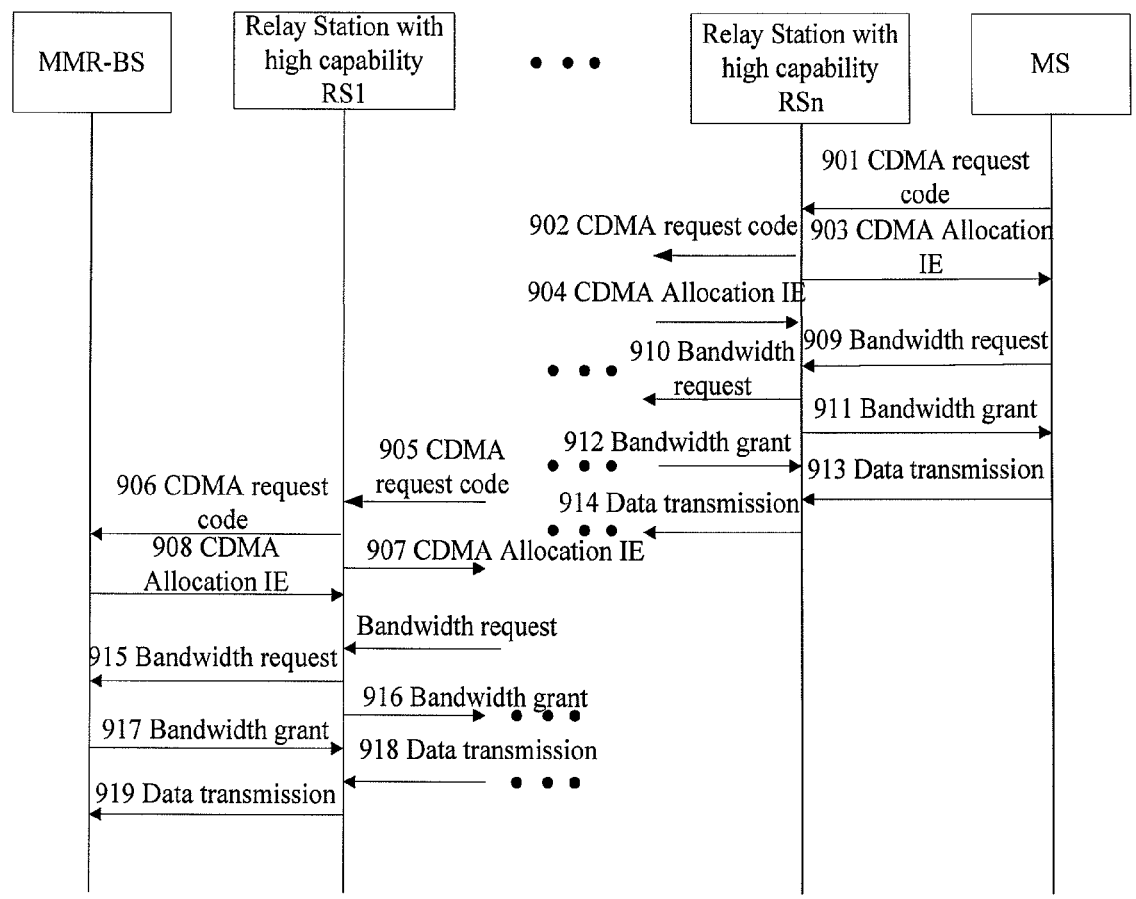
FIG. 9 is a schematic diagram illustrating the message flow in accordance with a fifth embodiment of the present disclosure.

FIG. 9 is a schematic diagram illustrating the message flow in accordance with this embodiment. As shown in FIG. 9, the method of this embodiment includes the following.

901 to 908: Each node from the MS to the MMR-BS sends a Code Division Multiple Access (CDMA) request code to its superordinate node; each node receiving the CDMA request code returns a CDMA_Allocation_IE to its subordinate node.

After receiving the CDMA code request, the superordinate node may send a CDMA request code to its superordinate node immediately without waiting for the arrival of data packets. That is to say, the superordinate node may send a CDMA request code to its superordinate node after receiving the CDMA request of its subordinate node and before the arrival of the data sent by the subordinate node, or send the CDMA request code when the data sent by the subordinate node arrives.

909 to 919 are the same as 501 to 511 in the second embodiment, and will not be further described herein.

It should be noted that, after connecting to the CDMA allocation information unit of its superordinate node, the node may directly send data with the bandwidth allocated by the CDMA allocation information unit without requesting bandwidth for itself. This embodiment is an example for sending a bandwidth request with the bandwidth allocated by the CDMA allocation information unit.

By the present disclosure, each node in the multi-hop network may acquire the bandwidth allocated by its superordinate node before receiving the data transmitted by its subordinate node, and the time interval between acquiring the bandwidth and receiving the transmitted data is relatively short, in this way not only the whole data transmission time may be reduced effectively but, also the allocated bandwidth is applicable to the real-time condition of link in the network and it is possible to effectively avoid the invalidation of the allocated bandwidth.

In accordance with the method for resource scheduling in a wireless system, embodiments of the present disclosure further provide a system for resource scheduling in the wireless system, which is applicable to the multi-hop network.

Figure 10:
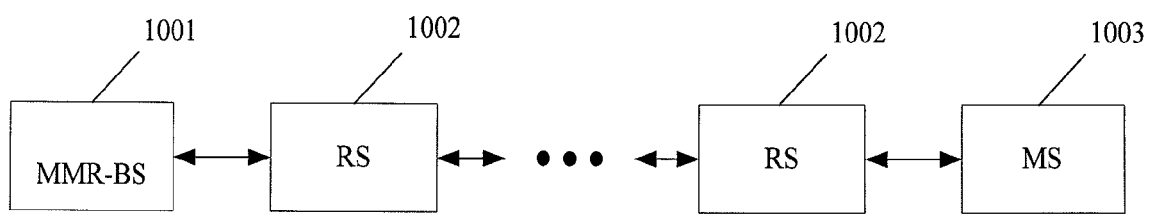
FIG. 10 is a schematic diagram illustrating the structure of a system for implementing resource scheduling in accordance with an embodiment of the present disclosure.

FIG. 10 is a schematic diagram illustrating the structure of a system for resource scheduling in a wireless system. As shown in FIG. 10, the system includes:

an MMR-BS1001, one or more than one RS1002 and one or more than one MS1003; the MMR-BS1001 is the most superordinate node, the MS1003 is the most subordinate node, and the superordinate node of the MS is an MS synchronous station.

The MS synchronous station 1002 grants bandwidth to MS1003, and MS1003 transmits data to its synchronous station with the acquired bandwidth; each node between MS1003 and MMR-BS1001 acquires bandwidth granted by its superordinate node during the time interval between granting the bandwidth to the subordinate node and receiving data from the subordinate node, and transmits the data to the superordinate node with the bandwidth granted by the superordinate node after receiving the data from subordinate node.

The foregoing descriptions are only preferred embodiments of the present disclosure and are not for use in limiting the protection scope thereof. Any modification, equivalent replacement and improvement made under the spirit and principle of the present disclosure should be included in the protection scope thereof.

What is claimed is:

1. A method for resource scheduling in a wireless system, applicable to a multi-hop network, comprising:
    acquiring by a Mobile Station (MS), bandwidth from an MS synchronous station, and transmitting data to the MS synchronous station with the bandwidth acquired from the MS synchronous station, wherein the MS as a subordinate node and the MS synchronous station as a superordinate node;
    acquiring the bandwidth by each of a plurality of nodes between the Mobile Station (MS) and a Mobile Multi-hop Relay Base Station (MMR-BS), wherein for each of the plurality of nodes, the acquired bandwidth is granted by a superordinate node to an adjacent subordinate node, and the acquired bandwidth takes place after granting the bandwidth to the adjacent subordinate node and before receiving the data from the subordinate node, and transmitting the data to the superordinate node of each of the plurality of nodes with the bandwidth granted by the superordinate node after receiving the data from the subordinate node,
    if the system needs to allocate the bandwidth for a traffic flow before the MS acquires the bandwidth from the MS synchronous station,
    generating, by the MMR-BS, a scheduling management message according to system resource and service requirements, and sending the scheduling management message generated by the MMR-BS to each of the plurality of nodes of a downlink hop by hop until the MS synchronous station receives the scheduling management message generated by the MMR-BS; wherein
    the scheduling management message generated by the MMR-BS is uplink scheduling information sent to the subordinate node of each of the plurality of nodes for indicating when to grant the subordinate node a given uplink bandwidth allocation and the allocated bandwidth.

2. The method of claim 1, wherein the data is Unsolicited Grant Service (UGS) data;
    the method further comprising:
    if it is necessary to readjust the bandwidth or add a new traffic flow during operating a UGS service,
    sending, by the MS, a polling request to the MS synchronous station;
    sending, by the MS synchronous station, a polling request to the superordinate node of the MS synchronous station after receiving the polling request from the MS, and initiating polling to the MS;
    sending, by the MS, a new bandwidth request to the MS synchronous station with the bandwidth acquired from the polling;
    granting, by the MS synchronous station, the bandwidth to the MS, and sending a new bandwidth request to the superordinate node of the MS synchronous station with the bandwidth acquired from the polling of the superordinate node after receiving the new bandwidth request from the MS;

sending, by the MS, the UGS service data or new service data to the MS synchronous station with the bandwidth acquired from the MS synchronous station; and sending, by the MS synchronous station, the UGS service data or the new service data to the superordinate node of the MS synchronous station with the new bandwidth acquired from the Bandwidth Grant of the superordinate node; wherein the superordinate node of the MS synchronous station may send the UGS service data or the new service data to the superordinate node thereof in a same manner until the UGS service data or the new service data is sent to the MMR-BS.

3. The method of claim 1, wherein the data is extended Real-time Polling Service (rtPS) service data;

the method further comprising:

if it is necessary to readjust the bandwidth during operating an extended rtPS, sending, by the MS, a new bandwidth request to the MS synchronous station;

granting, by the MS synchronous station, the bandwidth to the MS, and sending a new bandwidth request to the superordinate node of the MS synchronous station after receiving the new bandwidth request from the MS;

transmitting, by the MS, the extended rtPS service data to the MS synchronous station with the bandwidth acquired from the Bandwidth Grant of the MS synchronous station; and transmitting, by the MS synchronous station, the extended rtPS service data to the superordinate node of the MS synchronous station with the bandwidth acquired from the Bandwidth Grant of the superordinate node; wherein the superordinate node of the MS synchronous station may transmit the extended rtPS service data to the superordinate node thereof in a same manner until the extended rtPS service data is transmitted to the MMR-BS.

4. The method of claim 1, further comprising:

sending, by each node from the MS to the MMR-BS, a bandwidth request to the superordinate node of each of the plurality of nodes before acquiring bandwidth from the superordinate node.

5. The method of claim 4, wherein the sending a bandwidth request to the superordinate node of the node comprises:

sending the bandwidth request to the superordinate node after receiving a bandwidth request from the subordinate node and before data sent by the subordinate node arrives, or sending the bandwidth request to the superordinate node when the data sent by the subordinate node arrives.

6. The method of claim 4, further comprising:

before each of the plurality of nodes sends a bandwidth request to the superordinate node;

sending, by each of the plurality of nodes from the MS to the MMR-BS, a Code Division Multiple Access (CDMA) request code to the superordinate node;

returning, by each of the plurality of nodes, a CDMA_Allocation_IE to the subordinate node after receiving the CDMA request code.

7. The method of claim 6, wherein the sending a CDMA request code to the superordinate node comprises:

sending the CDMA request code to the superordinate node after receiving a CDMA request code of the subordinate node and before the data sent by the subordinate node arrives, or sending the CDMA request code to the superordinate node when the data sent by the subordinate node arrives.

8. The method of claim 4, further comprising:

before each node sends a bandwidth request to the superordinate node, initiating, by each node from the MS synchronous station to the MMR-BS, polling to the subordinate node.

9. The method of claim 8, further comprising:

before each node initiates polling to the subordinate node, sending, by each node from the MS to the MMR-BS, a polling request to the superordinate node in turn.

10. The method of claim 8, further comprising:

before the MS synchronous station initiates the polling to the MS, generating, by the MMR-BS, a scheduling management message according to the system resource and service requirements, and sending the scheduling management message generated by the MMR-BS to the subordinate node of the MMR-BS;

generating, by each node between the MMR-BS and the MS synchronous station, a scheduling management message in turn according to the received scheduling management message, and sending the scheduling message to the subordinate node; wherein the scheduling management message of each of the plurality of nodes is uplink scheduling information sent to the subordinate node for indicating when to poll the subordinate node and the size of bandwidth allocated for the polling.

11. The method of claim 8, further comprising:

before the MS synchronous station initiates the polling to the MS, generating, by the MMR-BS, a scheduling management message according to the system resource and service requirements, and sending the scheduling management message generated by the MMR-BS to each node of a downlink hop by hop until the MS synchronous station receives the scheduling management message generated by the MMR-BS; wherein the scheduling management message generated by the MMR-BS is uplink scheduling information sent to the subordinate node for indicating when to poll the subordinate node and the size of the bandwidth allocated for the polling.

12. A system for resource scheduling in a wireless system, applicable to a multi-hop network, comprising:

a Mobile Multi-hop Relay Base Station (MMR-BS), one or more Mobile Station (MS), one or more Relay Station (RS) between the MMR-BS and; wherein a superordinate node of the MS is an MS synchronous station;

the MS is capable of acquiring bandwidth from the MS synchronous station, and transmitting data to the MS synchronous station with the bandwidth acquired from the MS synchronous station;

each RS between the MS and the MMR-BS is enabled to acquire the bandwidth granted by the superordinate node of the RS after granting the bandwidth to the subordinate node of the RS and before receiving the data from the subordinate node, and transmitting the data to the superordinate node with the bandwidth granted by the superordinate node after receiving the data from the subordinate node, if the system needs to allocate the bandwidth for a traffic flow before the MS acquires the bandwidth from the MS synchronous station, the MMR-BS generates a scheduling management message according to system resource and service requirements, and sends the scheduling management message generated by the MMR-BS to each node of a downlink hop by hop until the MS synchronous station receives the scheduling management message generated by the MMR-BS; wherein the scheduling management message generated by the MMR-BS is uplink scheduling information sent to the subordinate node of the each node for indicating when to grant the subordinate node a given uplink bandwidth allocation and the allocated bandwidth.

13. A Relay Station (RS) for resource scheduling in a wireless system, located between a Mobile Station (MS) and a Mobile Multi-hop Relay Base Station (MMR-BS), configured to acquire bandwidth granted by the superordinate node of the RS after granting the bandwidth to the subordinate node of the RS and before receiving data from the subordinate node, and transmit the data to the superordinate node with the bandwidth granted by the superordinate node after receiving the data from the subordinate node, wherein:

if the system needs to allocate the bandwidth for a traffic flow before the MS acquires the bandwidth from the MS synchronous station:

the MMR-BS generates a scheduling management message according to system resource and service requirements, and sends the scheduling management message generated by the MMR-BS to each node of a downlink hop by hop until the MS synchronous station receives the scheduling management message generated by the MMR-BS; wherein the scheduling management message generated by the MMR-BS is uplink scheduling information sent to the subordinate node of the each node for indicating when to grant the subordinate node a given uplink bandwidth allocation and the allocated bandwidth.

* * * * *